(No Model.)

O. RIECK.
FILTER APPARATUS.

No. 416,076. Patented Nov. 26, 1889.

Witnesses:
Ewell A. Dick
Will E. Aughinbaugh

Inventor:
Otto Rieck,
by Shadler Baily
his Attorney

UNITED STATES PATENT OFFICE.

OTTO RIECK, OF MÜLHEIM-ON-THE-RHINE, PRUSSIA, ASSIGNOR TO LOUIS WELTER, OF COLOGNE, AND EUGEN KREISS, OF HAMBURG, GERMANY.

FILTER APPARATUS.

SPECIFICATION forming part of Letters Patent No. 416,076, dated November 26, 1889.

Application filed March 7, 1889. Serial No. 302,260. (No model.) Patented in Germany October 6, 1886, No. 39,951.

*To all whom it may concern:*

Be it known that I, OTTO RIECK, a subject of the Emperor of Germany, residing at Mülheim-on-the-Rhine, Prussia, Germany, have invented certain new and useful Improvements in Filter Apparatus for Purifying Oil and other Liquids, (for which I have obtained Letters Patent in Germany, No. 39,951, dated October 6, 1886,) whereof the following is a specification.

My invention relates to filtering apparatuses principally designed for the purification of waste lubricating-oil dirtied by use; and the improvement consists in the combination of a closed reservoir for the oil or other liquid to be filtered, a casing containing the filtering material, and means for compressing as well as for rarefying the air contained in the said reservoir above the surface of the liquid, the compression being applied for promoting the filtration, while the rarefaction is made use of for drawing oil and air backward through the filtering material in view of cleaning it.

Figure 1:
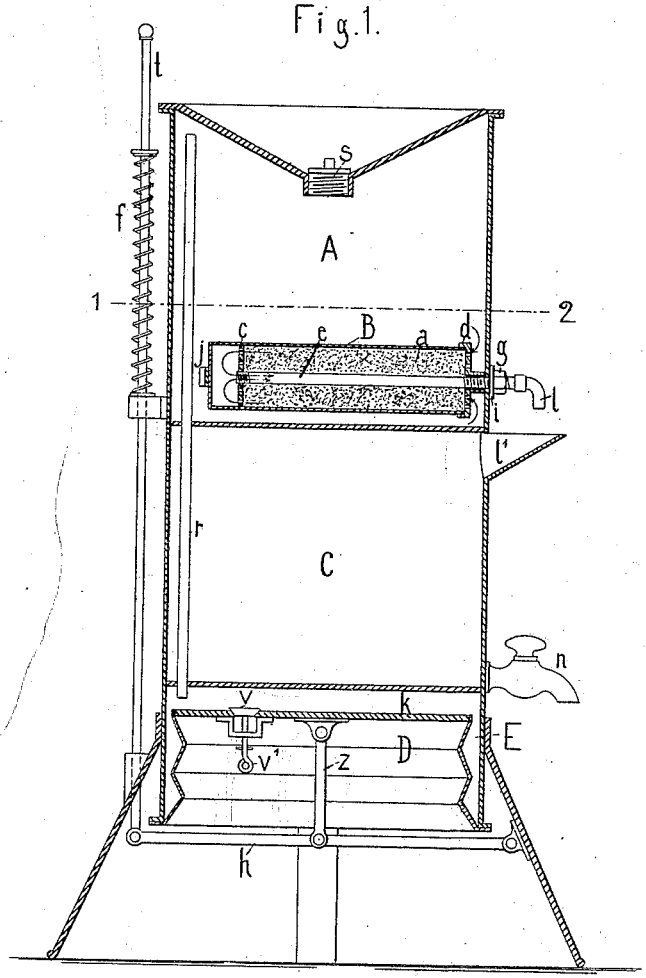
Figure 2:
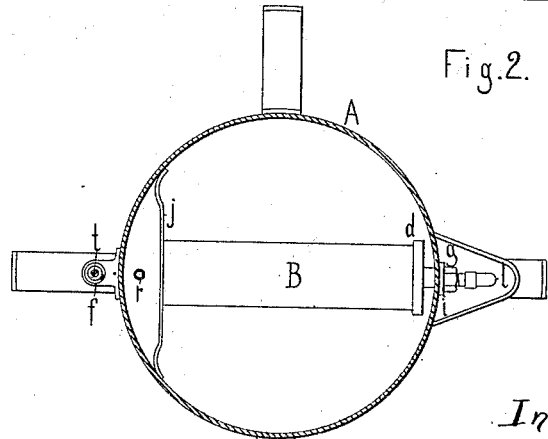

In the annexed drawings, Figure 1 shows in sectional elevation an apparatus carried out according to my invention. Fig. 2 is a horizontal section thereof on line 1 2, Fig. 1.

A is the reservoir for dirty liquid. The same has at the top, which is funnel-shaped, an aperture for the introduction of the liquid, the said aperture being provided with a screw-plug $s$ for hermetically closing it. Within the reservoir is arranged the casing B, closed at one end by the fixed bottom $b$ and having at the other end the removable perforated bottom $d$.

$c$ is a perforated piston, from which extends through the bottom $d$ and the wall of the reservoir A a tube $e$, on the outwardly-projecting portion whereof is screwed a nut $g$, and whose end, preferably provided with a bent nozzle, forms the outflow-orifice $l$. The space between the piston $c$ and the bottom $d$ is filled with the filtering material $a$, which may be compressed more or less by the nut $g$, the bottom $d$ abutting by means of a sleeve against the wall of the reservoir, so as to present the necessary resistance to the pressure of the material. The joint between the nut $g$ and the wall of the reservoir A is made tight by a washer $i$, of leather or india-rubber.

$j$ is a spring by which the casing B is maintained in its place.

C is the reservoir for purified liquid, having below the orifice $l$ a funnel $l'$ and provided with a cock $n$. Under the said reservoir is arranged a chamber E, containing the bellows D, the bottom $k$ whereof is connected by a bar $z$ and the lever $h$ to a rod $t$, the said rod being provided with a spring $f$, which presses the same upward, and thus tends to expand the bellows.

$v$ is a valve opening toward the inner space of the chamber E, and $r$ a tube that connects the latter with the top of the reservoir A. After the said reservoir has been filled with the liquid to be filtered and the plug $s$ screwed down the rod $t$ is depressed by hand, air being thereby drawn past the valve $v$ into the chamber E. After the release of the rod $t$ the spring $f$ causes the bellows to press the said air through the pipe $r$ into the reservoir A. The pressure thus created within the latter, in combination with gravity, forces the liquid through the filtering material $a$ into the space between the bottom $b$ and the piston $c$, whence it runs in purified state through the tube $e$ and funnel $l'$ into the reservoir C. The operation of actuating the bellows may of course be repeated as often as may be considered expedient.

For the purpose of cleaning the filtering material whenever it has become clogged by the deposits from the dirty or turbid liquid the bellows D are compressed from their expanded state by means of the rod $t$, while at the same time the valve $v$ is kept closed by hand through the medium of its stem $v'$. A rarefaction of air is thereby produced in the chamber E and in the reservoir A, which causes air to be drawn in at $l$ and to pass backward through the filtering material, together with the oil contained therein, the said material being thus rendered fit for renewed action.

I claim as my invention—

In a filtering apparatus, the combination of the closed receptacle A, the casing B, located within said receptacle and provided with a perforated bottom $d$ and piston $c$, filtering material placed between said bottom and piston, pipe $e$, passing through the wall of said reservoir and connecting with piston $c$, nut $g$, reservoir C, chamber E, bellows D, valve $v$, with stem $v'$, mechanism for compressing said bellows, spring $f$, and pipe $r$, all arranged and operating substantially as set forth.

In testimony whereof I have signed this specification in the presence of two subscribing witnesses.

OTTO RIECK.

Witnesses:
  LOUIS WELTER,
  GUSTAVE ALBERT OELRICHS.